(12) United States Patent
Ibrahim et al.

(10) Patent No.: US 11,949,342 B2
(45) Date of Patent: Apr. 2, 2024

(54) MULTIPLE PORT POWER CONVERTER DEVICE

(71) Applicant: DCBEL INC., Montréal (CA)

(72) Inventors: Peter Ibrahim, Westmount (CA); Hani Vahedi, Brossard (CA); Jean-Hugues Deschenes, Montréal (CA); Marc-André Forget, Saint Lazare (CA)

( * ) Notice: Subject to any disclaimer, the term of this patent is extended or adjusted under 35 U.S.C. 154(b) by 73 days.

(21) Appl. No.: 17/437,693

(22) PCT Filed: Mar. 12, 2020

(86) PCT No.: PCT/CA2020/050334
§ 371 (c)(1),
(2) Date: Sep. 9, 2021

(87) PCT Pub. No.: WO2020/181384
PCT Pub. Date: Sep. 17, 2020

(65) Prior Publication Data
US 2022/0149745 A1    May 12, 2022

Related U.S. Application Data

(60) Provisional application No. 62/817,104, filed on Mar. 12, 2019.

(51) Int. Cl.
*H02M 7/483* (2007.01)
*B60L 53/10* (2019.01)
(Continued)

(52) U.S. Cl.
CPC .............. *H02M 7/483* (2013.01); *B60L 53/11* (2019.02); *H02M 7/003* (2013.01); *H02M 7/043* (2013.01);
(Continued)

(58) Field of Classification Search
CPC ...... H02M 7/483; H02M 7/003; H02M 7/043; B60L 53/11; B60L 2210/12;
(Continued)

(56) References Cited

U.S. PATENT DOCUMENTS 9,923,484 B2    3/2018  Vahedi et al.
10,183,583 B2   1/2019  Narla
(Continued)

FOREIGN PATENT DOCUMENTS

CN    102917909 A    2/2013
CN    104160546 A    11/2014
(Continued)

OTHER PUBLICATIONS

Corresponding Indian patnet application No. 202127039235 Office Action dated Mar. 15, 2023.
(Continued)

*Primary Examiner* — Paul Dinh

(57) ABSTRACT

The present disclosure provides a bidirectional power converter capable of receiving and delivering AC and DC power from and to multiple ports in accordance to its different embodiments. The AC or DC input receives power and at least two power conversion circuits work with a plurality of switches for connecting provides DC or AC current at multiple ports. The power conversion circuits may be rectifier inverters and have module form that connect to the AC and DC ports via a backplane having multiple connectors. The apparatus may also provide DC to DC conversion using a buck/boost circuit.

15 Claims, 14 Drawing Sheets

(51) Int. Cl.
*H02M 7/00* (2006.01)
*H02M 7/04* (2006.01)

(52) U.S. Cl.
CPC ....... *B60L 2210/12* (2013.01); *B60L 2210/14* (2013.01); *B60L 2210/30* (2013.01); *B60L 2210/40* (2013.01)

(58) Field of Classification Search
CPC ............. B60L 2210/14; B60L 2210/30; B60L 2210/40; B60L 2210/10; B60L 53/14; B60L 53/22; B60L 53/51; Y02T 10/92; Y02T 90/12; Y02T 90/14; H02J 3/322; H02J 7/345; H02J 2300/24; H02S 40/32; B60Y 2200/91; Y02E 10/56
USPC ......................................................... 320/109
See application file for complete search history.

(56) References Cited

U.S. PATENT DOCUMENTS

| | | | |
|---|---|---|---|
| 2004/0130292 | A1 | 7/2004 | Buchanan et al. |
| 2013/0049677 | A1* | 2/2013 | Bouman .................. B60L 1/02 320/106 |
| 2015/0165917 | A1 | 6/2015 | Robers et al. |
| 2016/0126862 | A1 | 5/2016 | Vahed et al. |
| 2016/0176305 | A1 | 6/2016 | James et al. |
| 2018/0037121 | A1* | 2/2018 | Narla ....................... H02J 7/35 |
| 2018/0076626 | A1 | 3/2018 | Gudgel et al. |
| 2018/0076663 | A1 | 3/2018 | Gudgel et al. |
| 2018/0110150 | A1 | 4/2018 | Blanchet et al. |
| 2020/0070672 | A1* | 3/2020 | Vahedi .................. H02M 7/219 |

FOREIGN PATENT DOCUMENTS

| | | | |
|---|---|---|---|
| CN | 105322787 | A | 2/2016 |
| JP | 2007-535282 | A | 11/2007 |
| JP | 2013-521756 | A | 6/2013 |
| JP | 2015-507914 | A | 3/2015 |
| JP | 2020-537474 | A | 12/2020 |
| WO | 2014/020645 | A1 | 7/2016 |
| WO | 2018/026495 | A1 | 2/2018 |
| WO | 2019/071359 | A1 | 4/2019 |

OTHER PUBLICATIONS

Corresponding European application No. 20769504.0 extended European search report dated Apr. 8, 2022.
International application No. PCT/CA2020/050334 International Preliminary Report on Patentability Chapter II dated Jun. 16, 2021.
Hani Vahedi et al., PUC converter review: Topology, control and applications. IECON 2015—41st Annual Conference of The IEEE Industrial Electronics Society, IEEE, Nov. 9, 2015 (Nov. 9, 2015), pp. 4334-4339.
Hani Vahedi et al., Sensor-Less Five-Level Packed U-Cell (PUC5) Inverter Operating in Stand-Alone and Grid-Connected Modes. IEEE Transactions on Industrial Informatics, IEEE Service Center, New York, NY, US, vol. 12, No. 1, Feb. 1, 2016 (Feb. 1, 2016), pp. 361-370.
International application No. PCT/CA2020/050334 International Search Report dated Jun. 10, 2020.
International application No. PCT/CA2020/050334 Search Strategy dated Jun. 10, 2020.
International application No. PCT/CA2020/050334 Written Opinion of the International Searching Authority dated Jun. 10, 2020.
Vahedi, H. et al., "A Novel Multilevel Multioutput Bidirectional Active Buck PFC Rectifier". IEEE Transactions on Industrial Electronics, Apr. 20, 2016 (Apr. 20, 2016), vol. 63, No. 9, pp. 5442-5450.
Corresponding Chinese patent application No. 202080010366.0 Office Action dated Dec. 28, 2023. (Google translation provided).
Corresponding Canadian patnet application No. 3,152,365 Office Action dated Oct. 11, 2023.
Corresponding Japanese patent application No. 2021-553793 Office Action dated Jan. 30, 2024. (Google translation provided).

\* cited by examiner

MULTIPLE PORT POWER CONVERTER DEVICE

This application claims priority from U.S. Provisional Patent Application 62/817,104 filed Mar. 12, 2019, the specification of which is incorporated herein by reference.

TECHNICAL FIELD

The present relates to the field of power converters. The present also relates to the field of and more particularly to energy management systems.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

As more and more people become interested in using renewable and environmentally friendly energy resources use of solar panels, electric cars become more popular. Such technologies in most cases need to be connected to and work with the power grid or the home electrical wiring. Furthermore, in regions with variable electricity tariffs for different times of the day, using an electric vehicle and/or solar energy may be more attractive for consumers if they could manage their consumption and production of energy to benefit from energy tariffs that are cheaper.

Solar panels or photovoltaic (hereinafter "PV") systems have specific advantages as an energy source causing no pollution and no emissions which, generally, generate DC power. In order to use this energy with household equipment's an inverter is normally used. Inverter is a type of electrical converter which converts the variable direct current (DC) output of a photovoltaic (PV) solar panel into a utility frequency alternating current (AC) that can be fed into a commercial electrical grid or used by a local, off-grid electrical network. There are several types of inverters used with solar panels such as stand-alone inverters, grid-tie inverters, battery backup inverters, and Intelligent hybrid inverters.

Since the electricity generation from solar panels fluctuates and may not be easily synchronized with a load's electricity consumption, when there is no solar electricity production, it is necessary to store energy for later use for example in a battery or other storage system to manage energy storage and consumption with an intelligent hybrid (smart grid) inverter.

Furthermore, electric cars ("EV"), are becoming more and more popular. The new "level 3" charging systems, such as the charger disclosed by the applicant in the international PCT patent application having serial number PCT/CA2018/051291, are capable of providing in addition to AC, DC power to and from one or more EVs.

It must be mentioned that despite producing DC power, PV panel outputs cannot be directly fed to an EV vehicle to charge its battery.

Moreover, the EV charging apparatuses available in the art do not provide the possibility of using the EV battery as an energy source for the household (Vehicle to Home [V2H]) or vehicle-to-grid (V2G).

There exists a need for an efficient system with multiple electrical ports having capability to convert energy between AC and DC from and to different sources such as PV panels, EV vehicle, backup battery, home electrical system, and to manage energy distribution between these sources.

Likewise, there exist a need for a smart device capable of converting multiple AC and DC consumer and generator sources with the capability of converting, adjusting and connecting these sources when required.

SUMMARY

This patent application provides solution to above-mentioned problems by providing a conversion unit having multiple AC and DC electrical ports capable of receiving, converting, and delivering both AC and DC current between different sources.

In one broad aspect, the present disclosure provides a power converter comprising at least one AC port for receiving and delivering AC current, a plurality of DC ports for receiving and delivering DC current at variable voltages and a plurality of switches receiving current from a first-selected group of said at least one AC port and said plurality of DC ports and delivering to a second selected group of said at least one AC port and said plurality of DC ports. It may also have one or more power conversion circuit or modules connecting to the plurality of switches to receive current from a selection, one or more of the AC or DC ports and to deliver some other ports. The converter also has controller for controlling the switches to send or receive current from ports or converter modules and direct them to the desired destination. The controller may determine the input and output of the power converter through managing the switches.

In some embodiments of the present disclosure, the power conversion circuit or unit may be bidirectional power converters.

In some examples of the present disclosure, the power converter may also include a connector backplane with plurality of module connectors. In one embodiment, the power conversion circuits may be conversion modules connecting to the module connectors. It will be appreciated by those skilled in the art that the module connectors maybe socket type connector receiving the conversion module or typical connectors that can be connected to modules by other means such as a simple wire connection.

In one exemplary embodiment, of the present disclosure, the power conversion circuits may further include a DC to DC conversion circuit. It will be appreciated by those skilled in the art that the DC to Dc conversion unit may be a separate module or integrated within the bidirectional AC-DC modules.

In one example, the plurality of switches used for receiving and redirecting the current between the ports may be located and or integrated in the same conversion circuit or module. Alternatively, the plurality of switches may be located on different power conversion circuits or on the backplane connector of the power converter. In one example the switches may be placed on a separate independent module that can connect either directly to the conversion module or through the backplane connector.

In some examples, the power converter may receive from one or more of the DC ports DC current from a DC source and either convert it or use it directly for AC or DC loads. For example, any DC source such as an EV DC battery, a backup battery, a PV solar panel can be the DC source which may be used for charging another EV vehicle, for household energy purposes, a back-up energy source in case of a black out or even to give back to the grid.

In one embodiment, the converter circuit or modules may be multilevel converter topology including three, five or seven level topologies. The details of a novel 5 level topology has been disclosed by the applicant in the international PCT patent application having serial number PCT/CA2018/051291 with the publication number WO/2019/071359.

In one exemplary embodiment, one or more of the power conversion circuits may be a rectifier circuit comprising an AC input connected to said AC port through said plurality of switches, at least one high-voltage capacitor for storing power, an inductor connected in series with said AC input, a low-voltage capacitor, two high-voltage switches connected between a first AC input terminal and opposed ends of said high-voltage capacitor, two intermediate low-voltage power switches connected between said opposed end of said high-voltage capacitor and opposed ends of said low-voltage capacitor, and two terminal low-voltage power switches connected between said opposed ends of said low-voltage capacitor and a second AC terminal, wherein a DC load can be connected to said opposed ends of said high-voltage capacitor, a modulator receiving a reference signal from a converter controller, a state selection circuit receiving said at least one comparison signal and outputting a state signal, a switching pulse generator receiving said state signal and connected to gates of said power switches. In one exemplary embodiment, the conversion circuit may be a bidirectional rectifier/inverter circuit wherein said inductor is connected in series with said AC input, said low-voltage capacitor, said two high-voltage power switches connected between said first AC terminal of said AC port and opposed ends of said high-voltage capacitor, said two intermediate low-voltage power switches connected between said opposed end of said high-voltage capacitor and opposed ends of said low-voltage capacitor, and said two terminal low-voltage power switches connected between said opposed ends of said low-voltage capacitor and said second AC terminal of said AC port, wherein each of said plurality of DC ports be connected to said opposed ends of said high-voltage capacitor; and wherein said controller works in an inverter mode to generate and apply to said two high-voltage power switches, said two intermediate low-voltage power switches and said two terminal low-voltage power switches signal waveforms comprising a first control signal for causing said low-voltage capacitor to be series connected with said DC port and said AC port and charged to a predetermined value proportional to a Voltage of said DC port, and a second control signal for causing said low-voltage capacitor to be disconnected from the DC port and series connected with the AC port, thereby causing the low-voltage capacitor to be discharged. In one embodiment, the power converter works as a rectifier as may have two diodes instead of two high-voltage switches.

In one example of the present disclosure, the converter may also have an interface for communicating with conversion circuit controller and said switch controller. The interface may also communicate with an EV computer, a solar panel management system or home management system. It may further be capable of communicating with an online platform for updating the consumption patterns and or communicating with a user online interface or application for the purposes changing the settings of the device.

It will be appreciated by those skilled in the art that conversion circuit controllers and the switch controller and any other controllers used in the power converter may be separate units, or integrated within the same controller circuits may include off board components which may be connected directly to the converter circuits or alternatively connect through the backplane connector.

It will be understood by those skilled in the art that different combinations may be implemented with more power conversion circuits being modular or integrated into the backplane and other parts.

In some embodiments, the apparatus may be adapted to receive DC current from a first port of said plurality of DC ports and deliver variable voltage DC to a second port of said plurality of DC ports. In one example the first port and the second port are located on the same power conversion circuit, while in other examples they maybe located on different power conversion circuits or on a backplane of the apparatus.

In some embodiments, the plurality of DC ports comprises at least two electric vehicle connection for providing and receiving DC current from two electric vehicles. In one example, the apparatus may include a solar panel connection for receiving DC current from a solar panel.

In some embodiments, the power converter may include one or more buck/boost converter circuit for converting DC power. The buck/boost circuit may be located on each of the power conversion circuits, on the connector backplane or as modular buck/boost circuit connecting to the backplane connector.

In one broad aspect, the present disclosure provides a power conversion apparatus comprising an AC port for connecting to single-phase AC power, a plurality of DC ports, at least two power conversion circuits having an AC input connected to the AC port and a variable voltage DC output; and a plurality of switches for connecting a selected one or more of said DC ports to selected ones of the DC output of said power conversion circuits.

In some embodiments, the apparatus further comprises a connector backplane with module connectors or sockets. The at least two power conversion circuits may be modules adapted to connect to the module connectors or sockets.

It will be obvious to those skilled in the art that different combinations may be implemented with more power conversion circuits being modular or integrated into the backplane and other parts.

In some embodiments, the apparatus is adapted to receive DC current from a first port of said plurality of DC ports and deliver variable voltage DC to a second port of said plurality of DC ports. In one example the first port and the second port are located on the same power conversion circuit, while in other examples they may be located on different power conversion circuits or on a backplane of the apparatus.

In some embodiments, the plurality of DC ports comprises at least two electric vehicle connection for providing and receiving DC current from two electric vehicles. In one example, the apparatus may include a solar panel connection for receiving DC current from a solar panel.

In some embodiments, the plurality of switches may be placed on the connector backplane as an integrated part of the backplane, as a switch module or card or hardwired to the backplane.

In one embodiment, the plurality of switches may be placed on one or more of the at least two power conversion circuits.

In one example, the power conversion circuits comprise a multilevel converter topology, at least one high-voltage capacitor for storing power at a voltage boosted above a peak voltage of the AC input and a rectifier circuit. The rectifier circuit includes an inductor connected in series with said AC input, a low-voltage capacitor. It also includes either two diodes, two intermediate low-voltage power switches connected between the opposed end of said high-voltage capacitor and opposed ends of said low-voltage capacitor, and two terminal low-voltage power switches connected between said opposed ends of said low-voltage capacitor and a second AC terminal a plurality of DC ports. A DC load can be connected the opposed ends of said high-voltage capacitor. It also includes a controller having at least one sensor for sensing current and/or voltage in the rectifier circuit and connected to a gate input of said two intermediate low-voltage power switches and said two terminal low-voltage power switches.

In one embodiment, the controller works in a rectifier mode having at least one sensor for sensing current and/or voltage in said rectifier circuit and connected to a gate input of said two high-voltage power switches, said two intermediate low-voltage power switches and said two terminal low-voltage power switches for causing said power conversion circuit to operate in a rectifier mode wherein a voltage of said high-voltage capacitor is higher than a peak voltage of said AC input, and said two high-voltage power switches are controlled to switch on and off at a frequency of said AC input, and said two intermediate low-voltage power switches and said two terminal low-voltage power switches are switched with redundant switching states in response to a measurement of a voltage present at said low voltage capacitor so as to maintain said low voltage capacitor at a predetermined fraction of a desired voltage for said high-voltage capacitor and to thus maintain said high voltage capacitor at a desired high voltage, with said rectifier circuit supplying said DC load and absorbing power as a five-level active rectifier with low harmonics on said AC input.

In one embodiment the rectifier circuit may be bidirectional rectifier/inverter circuit. In this embodiment, we will need two high-voltage switches and cannot have two high-voltage switches. The inductor may be connected in series with said AC port, the low-voltage capacitor, the two high-voltage power switches connected between the first AC terminal of the AC port and opposed ends of said high-voltage capacitor, the two intermediate low-voltage power switches connected between the opposed end of the high-voltage capacitor and opposed ends of the low-voltage capacitor, and the two terminal low-voltage power switches connected between the opposed ends of the low-voltage capacitor and the second AC terminal of the AC port. In this example the plurality of DC ports be connected to the opposed ends of said high-voltage capacitor and the controller may work in an inverter mode to generate and apply to said two high-voltage power switches, said two intermediate low-voltage power switches and said two terminal low-voltage power switches signal waveforms comprising a first control signal for causing said low-voltage capacitor to be series connected with said DC port and said AC port and charged to a predetermined value proportional to a Voltage of said DC port, and a second control signal for causing said low-voltage capacitor to be disconnected from the DC port and series connected with the AC port, thereby causing the low-voltage capacitor to be discharged.

In some embodiments, the apparatus may include one or more buck/boost converter circuit for converting DC power. The buck/boost circuit may be located on each of the power conversion circuits, on the connector backplane or as modular buck/boost circuit connecting to the backplane.

BRIEF DESCRIPTION OF THE DRAWINGS

The present examples will be better understood with reference to the appended illustrations which are as follows.

DESCRIPTION

Figure 1A:
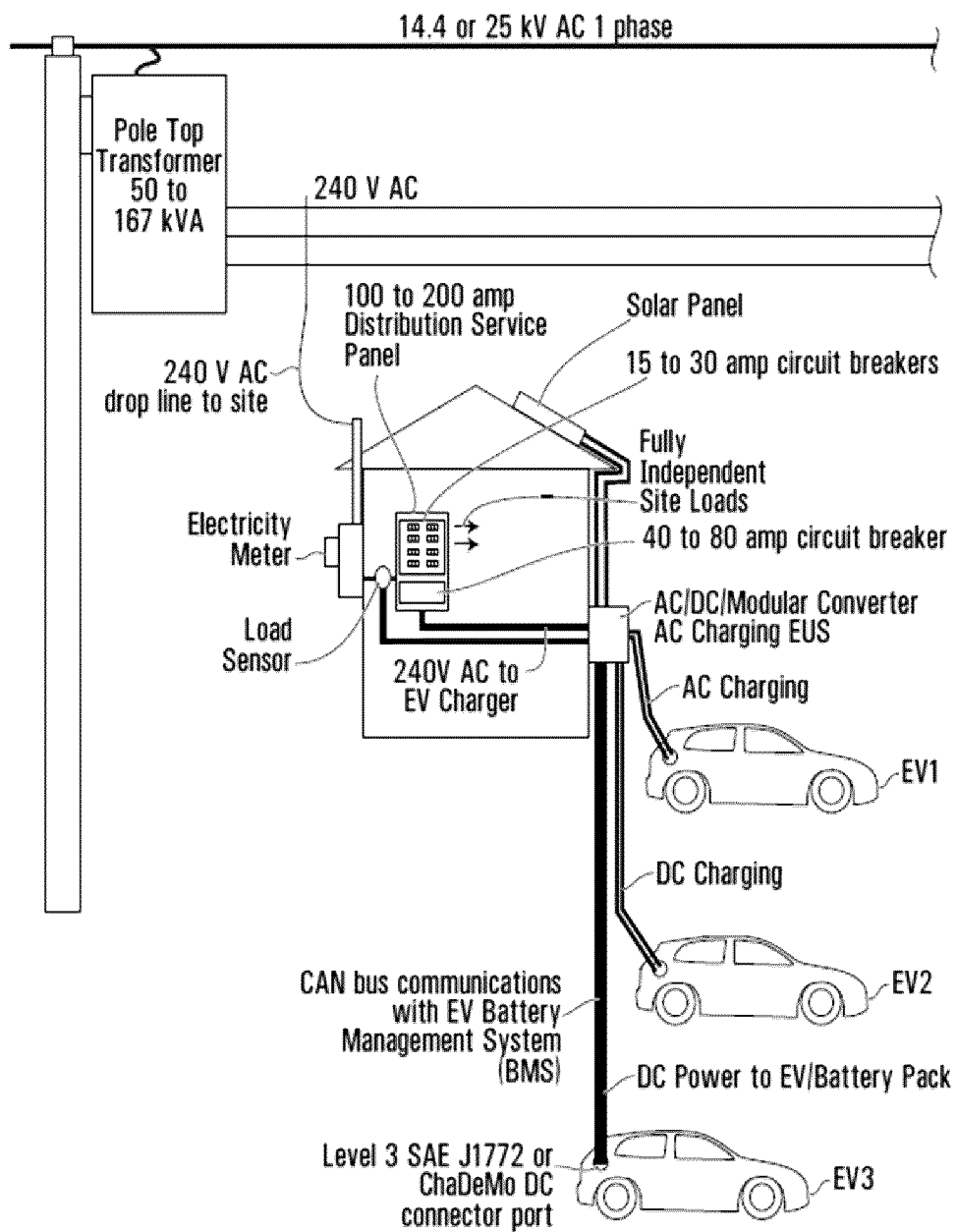
FIG. 1A is a schematic illustration of the physical installation of a home EV charging system including a pole-top transformer, residential electrical entry with a load sensor and a main circuit breaker panel, a 240 V AC power line between the panel and a apparatus, two cable connection extending between the apparatus and an electric vehicle (EV) with CAN bus connection between the EV and the apparatus and a solar panel connection.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

FIG. 1.A illustrates the physical context of an embodiment in which split single phase main power is delivered from a utility pole top transformer, as is the most common type of electrical power delivery in North America. The transformer receives typically 14.4 kV or 25 kV single-phase power from a distribution line and the transformer can handle approximately 50 kVA to 167 kVA of power delivered as split phase 240 VAC to a small number of homes or electrical entries. Each electrical entry is typically configured to handle between 100 A to 200 A of power at 240 VAC, namely about 24 kVA to 48 kVA (the common assumption is that 1 kVA is equivalent to 1 kW). As shown, the conversion apparatus or device connects to the network via the AC connection and can connect to multiple vehicles and/or solar panel. This could be achieved thanks to bidirectional (rectifier/inverter) nature of the apparatus which provides it by the capability of receiving AC or DC power from one port and providing AC or DC from other ports.

It will be appreciated by those skilled in the art that despite the single phase entry illustration, the embodiments of present disclosure are not restricted to split single phase 240 VAC power systems and that any of the embodiments disclosed herein may be adapted to work with different power networks delivering AC voltage.

The electrical entry typically comprises a usage meter, the main breaker having a rating corresponding to the total permitted load (e.g. 100 A or 200 A), and a panel having circuit breakers for each household circuit which may be supplied with 240 VAC power or 120 VAC power from the split phase 240 VAC input. While most circuit breakers have capacities of between 15 A to 30 A, some can be lower (namely 10 A) and some may be larger, such as 40 A, for large appliances. In some countries, electrical entries have a lower capacity, such as 40 A to 60 A, and in countries with 240 VAC in all household circuits, the power is not a split phase, but regular single phase 240 VAC (the voltage level used can vary from about 100 V to 250 V).

As illustrated in FIG. 1, the conversion apparatus/converter is connected to a circuit breaker of the main panel through a breaker having a larger current rating, such as 40 A to 80 A, although the apparatus disclosed can consume over 100 A if desired. The need for a circuit breaker specific to the apparatus is determined by electrical codes. The cable connecting the apparatus to the panel is rated for such high current. The connection to the electrical panel can be a direct fixed wiring, or a high-voltage socket can be installed and connected to the electrical panel such that the apparatus connects to the panel using a cable and plug, for example, those that are similar to those used for appliances like ovens or clothes dryers. The apparatus is shown to be connected to a single load sensor that senses the load drawn by the whole panel including the apparatus. The apparatus cable can be a conventional apparatus cable and plug, as is known in the art.

Furthermore, as illustrated in FIG. 1A, the converter may connect to a solar panel, as well as one or more electric vehicle.

FIG. 1.B is a block diagram showing an exemplary power conversion apparatus 10 with an AC port 18, multiple DC and EV/DC ports 12 and 14, DC/EV input port 16, and an off-board component panel 20. As illustrated in FIG. 1A, the ports 12 and 14 may connect to EV1 and EV2 and DC/EV port 16 may connect to solar panels to use the DC energy produced by the panels.

In some embodiments, the apparatus 10 may be adapted to receive DC current from a first port such as EV/DC port 12 of the plurality of DC ports and deliver variable voltage to a second port such as the EV/DC port 14. This may be achieved by using a plurality of switches that may be located on a backplane 22 on conversion circuit module 100 or on a separate switching module that may connect to the backplane or directly to the conversion circuit modules 100.

It will be appreciated by those skilled in the art that, although module 100 is shown to be a bidirectional conversion module, any other type of modules such as rectifier, inverters, DC-DC, buck boost module and surge protector module, depending on the need, may be used in the converter device.

Figure 8:
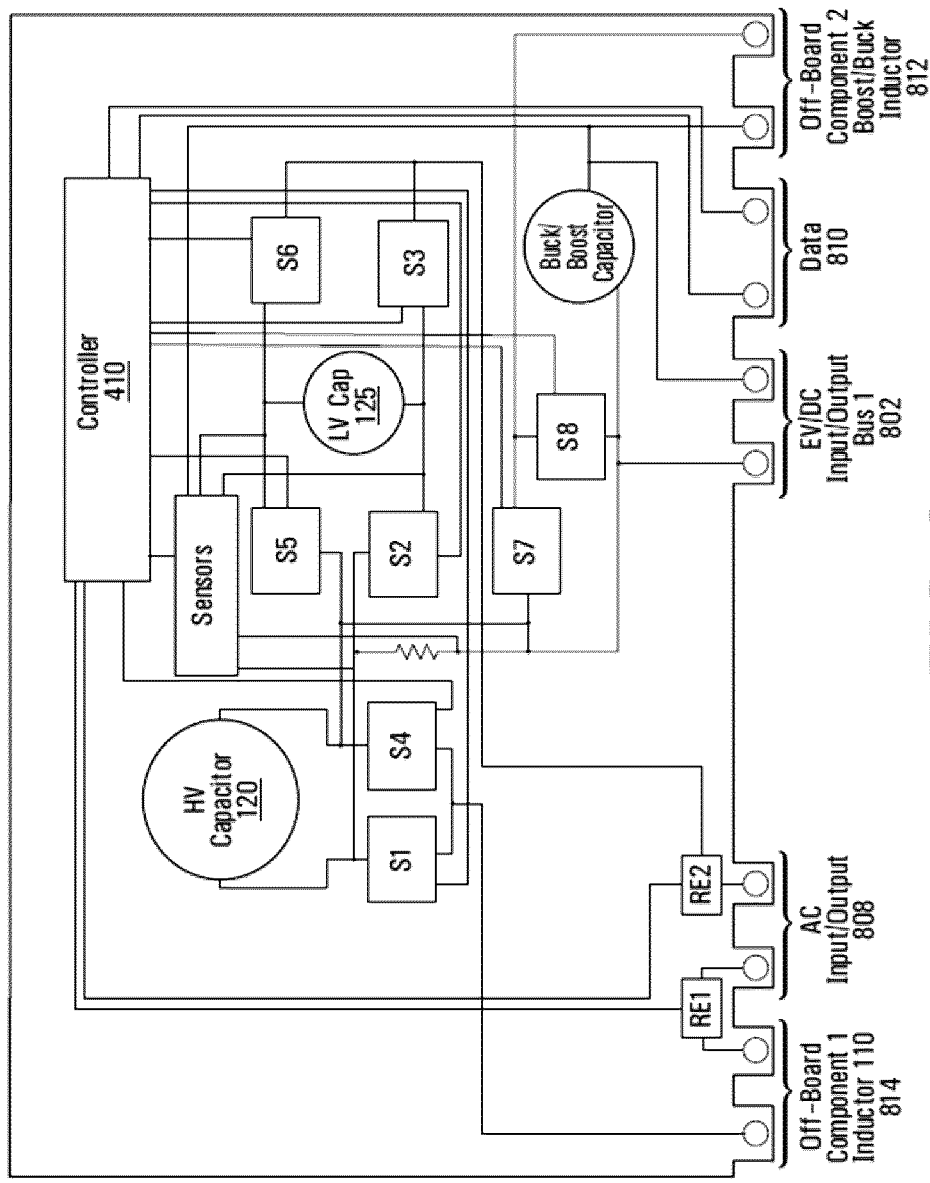
FIG. 8 is a schematic illustration of a power converter module with one DC output in accordance with one embodiment of the present disclosure.
Figure 9:
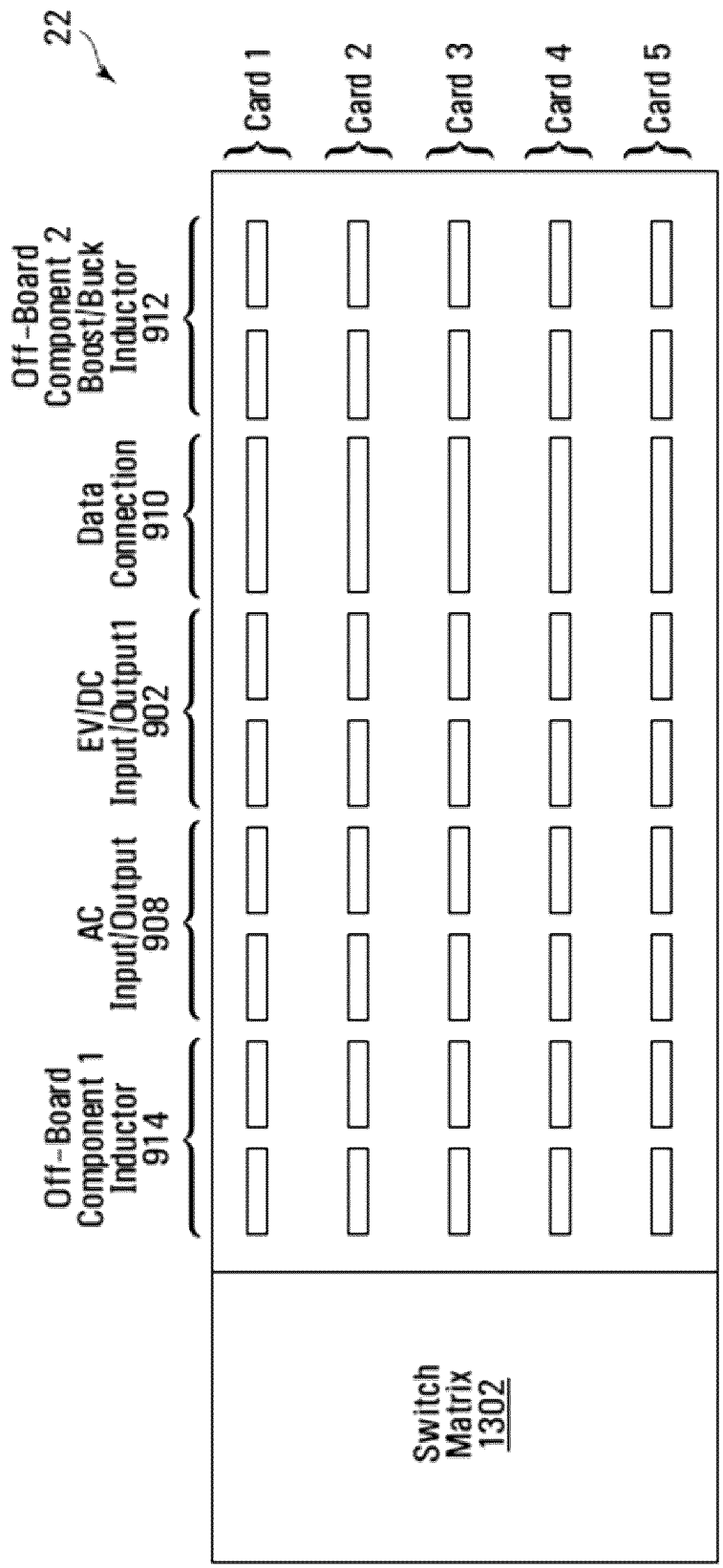
FIG. 9 is a schematic illustration of a backplane working with the power converter module shown in FIG. 8 in accordance with one embodiment of the present disclosure.

As illustrated in FIG. 8, in one example, the first port 12 and the second port 14 are located on the same power conversion circuit 100, while in other examples they may be located on different power conversion circuits or on a backplane 22 of the apparatus.

Figure 1B:
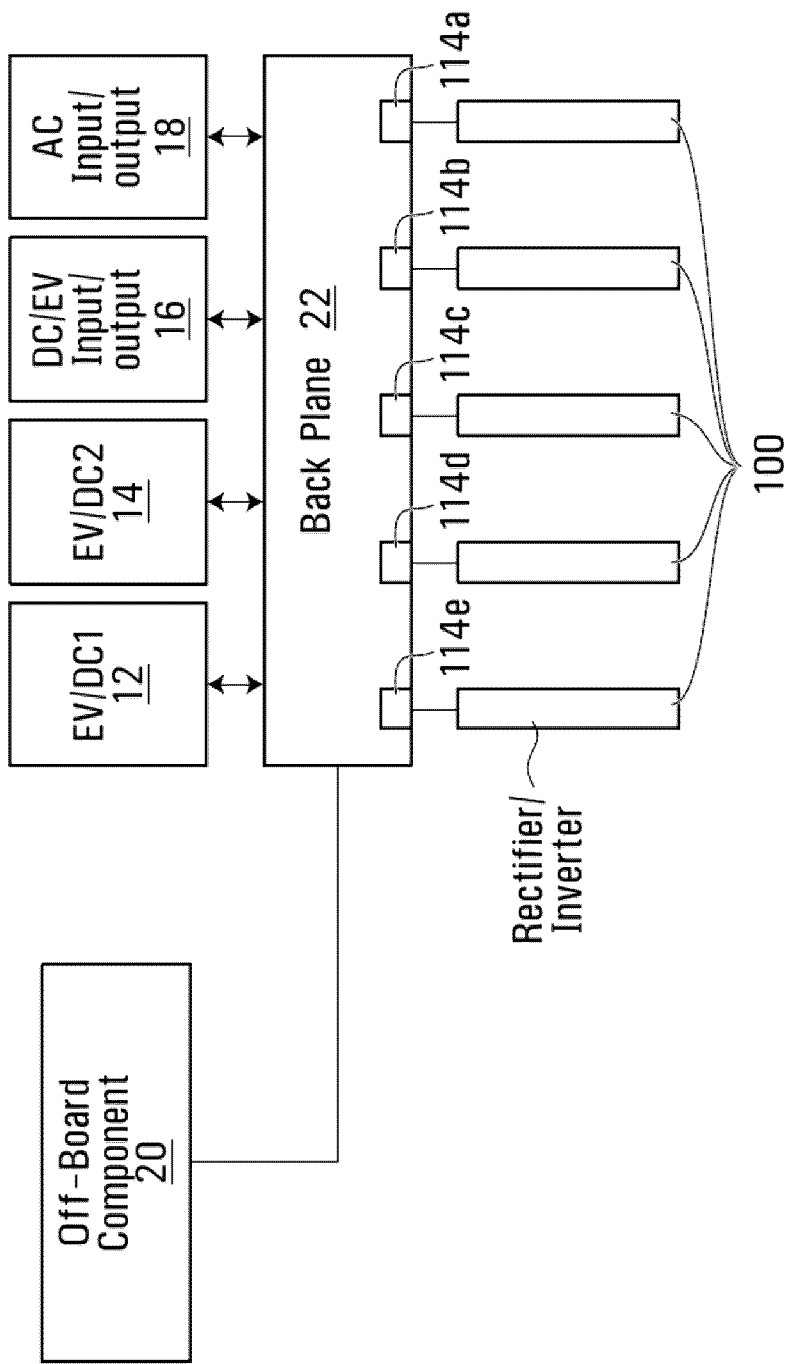
FIG. 1B is a block diagram showing a power conversion apparatus with multiple DC and AC ports and off-board component panel in accordance to one embodiment of the present disclosure.

Referring to FIG. 1B, the converter modules 100 may connect to the backplane 22 using connector 114 (here shown as connectors 114a, 114b, 114c, 114d, 114e each connecting to one module 100). The converter 10 may also benefit from an off-board component board 20 which in this embodiment is used for purposes of housing the inductors.

Figure 2A:
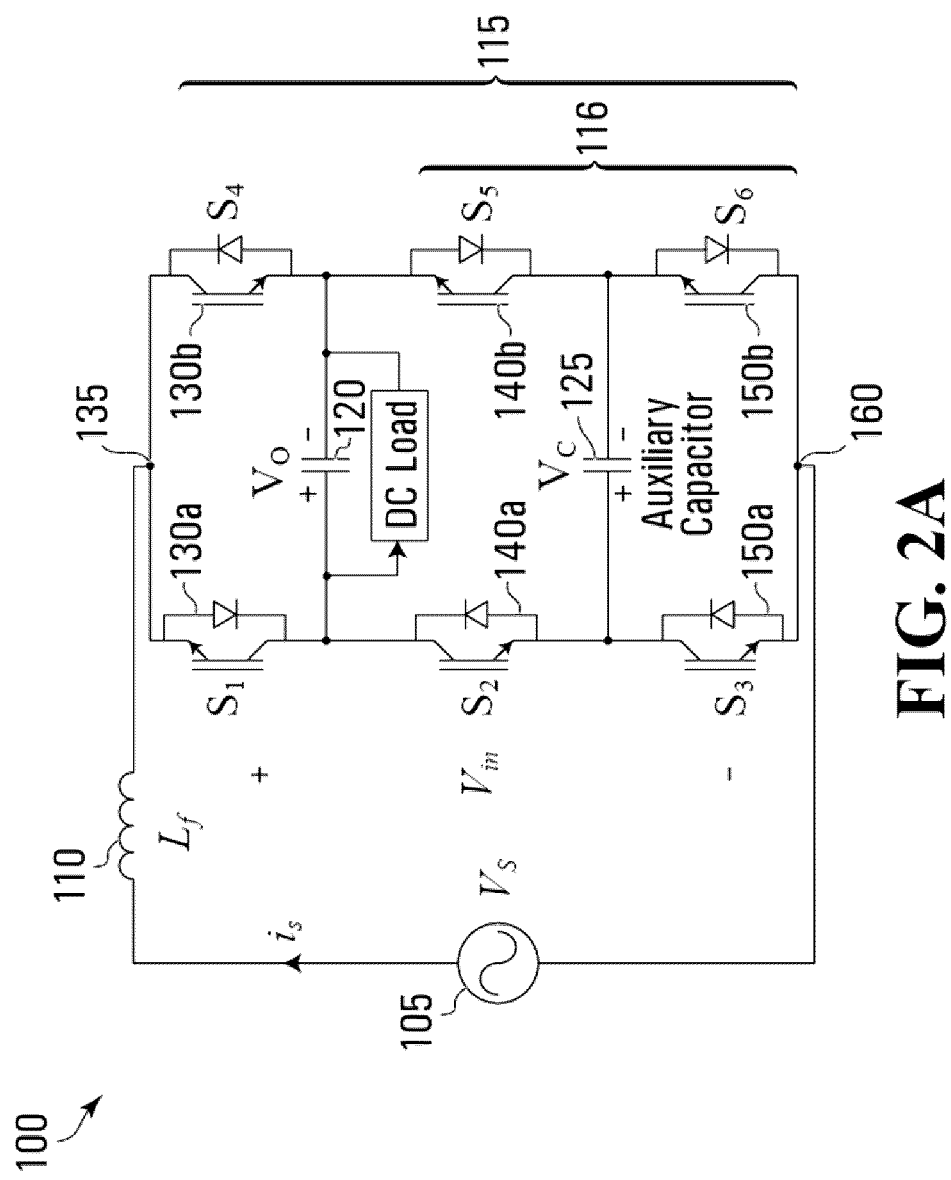
FIG. 2A shows a circuit diagram of a conversion circuit with a 5-level topology circuit working in a rectifier mode, according to a particular example of implementation.
Figure 2B:
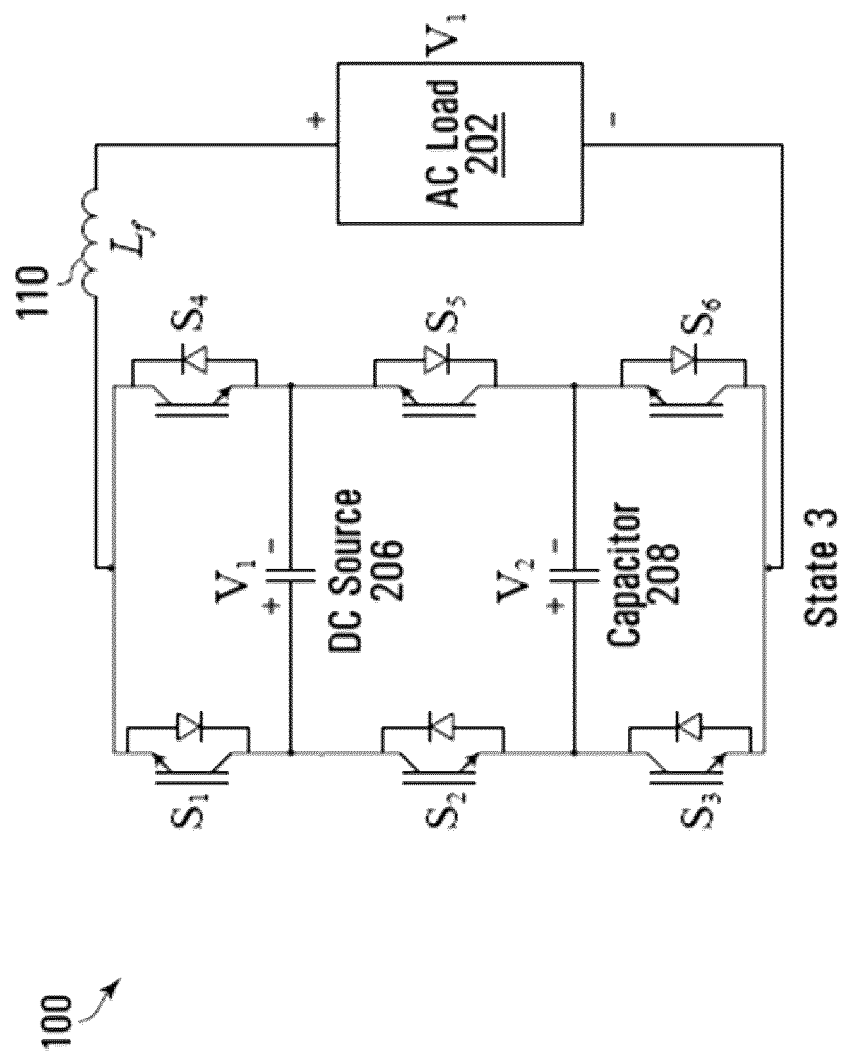
FIG. 2B shows a circuit diagram of a battery apparatus converter with a 5-level topology circuit working in an inverter mode, in accordance with one embodiment of the present disclosure.

FIG. 2A to 2B show details of an example of the type conversion circuit modules 100 that may be used in the conversion apparatus or device 10 for an electric vehicle according to a particular example of implementation.

As shown in FIG. 2A an exemplary conversion circuit 100 working in the rectifier mode comprises an AC input 105, an inductive filter 110 connected in series with the AC input 105, and a 5-level topology circuit 115.

In some examples, the inductive filter 110 in this non-limiting example may be a 2.5 mH inductor. Conveniently the present design allows for a small geometry of the overall power conversion circuit 100, due in part to the small size of the inductive filter 110. The inductive filter 110 can vary according to design as chosen based on the application, power rating, utility voltage harmonics, switching frequency, etc. Although the simplest such filter is a single inductor, in an alternative embodiment the inductive filter 110 may include a combination of inductor(s) and capacitor(s), e.g., an (e.g., 2 mH) inductor connected to a capacitor (e.g., 30 µF), itself connected to ground. The choice of the filter has an impact on the overall size of the design and losses, with a bigger filter increasing the size of the overall design and generally incurring more losses.

The 5-level circuit may comprise a high-voltage capacitor 120, at least one low-voltage capacitor 125, two high-voltage power switches 130a, 130b connected between a first terminal 135 and respective opposed ends 145a, 145b of the high-voltage capacitor 120, two intermediate low-voltage power switches 140a, 140b, each connected between respective ones of the two opposed end 145a, 145b of the high-voltage capacitor 120 and respective opposed ends 155a, 155b of the low-voltage capacitor 125, and two terminal low-voltage power switches 150*a*, 150*b* each connected between a second input terminal 160 and respective ones of the opposed ends 155*a*, 155*b* of the low-voltage capacitor 125.

As illustrated in FIG. 2B, the power conversion module 100 may use the power operate in bidirectional states. That means that 5-level circuit must have the high-voltage power switches 130*a*, 130*b*, and cannot replace them replaced them with two diodes, to convert voltage/current from AC to DC in a rectifier mode as shown in FIG. 2A or from DC to AC in an inverter mode as shown in FIG. 2B with an AC load 202 and a DC source 206

The details of the converter module (module 100), how it works, and its switching details has been disclosed by the applicant in the international PCT patent application having serial number PCT/CA2018/05129 with the Publication Number WO/2019/071359.

For practical implementation, a power conversion apparatus comprising the power conversion circuit 100 may comprise a user-interchangeable DC vehicle charging cable and charging plug, e.g., having a compatible format for fitting a standardized plug/socket (i.e., SAE J1772, ChaDeMo, or other) in an EV.

It will be appreciated by those skilled in the art that any kind of connector can be used as a backplane and the purpose of module connector is only to facilitate and simplify the installation process for the user and any kind of connector can be used as the backplane.

Furthermore, it will be appreciated by those skilled in the art that the power conversion apparatus may benefit from a user interface that may have a screen and have wired or wireless connection with an end device such as a computer or cellphone through an application to allow the user manually adjust the variants through such interface. This adjustment may be giving priority to the charging of the devices, giving a schedule for charging, managing how the solar panel DC is consumed and distributed or any other function required by the user in term of adjusting input and output of the device throughout the day.

Moreover, it will be understood by those skilled in the art that the AC and DC outputs can use a separate or same physical outlet or cable. In some embodiments, the outlet is capable of communicating with the vehicle's charge controller.

As described herein, in different embodiments the power conversion circuit 100 may have off-board or on-board components such as inductors and switching elements. Furthermore, the power conversion circuit 100 may have a buck/boost circuit integrated in it.

Figure 3:
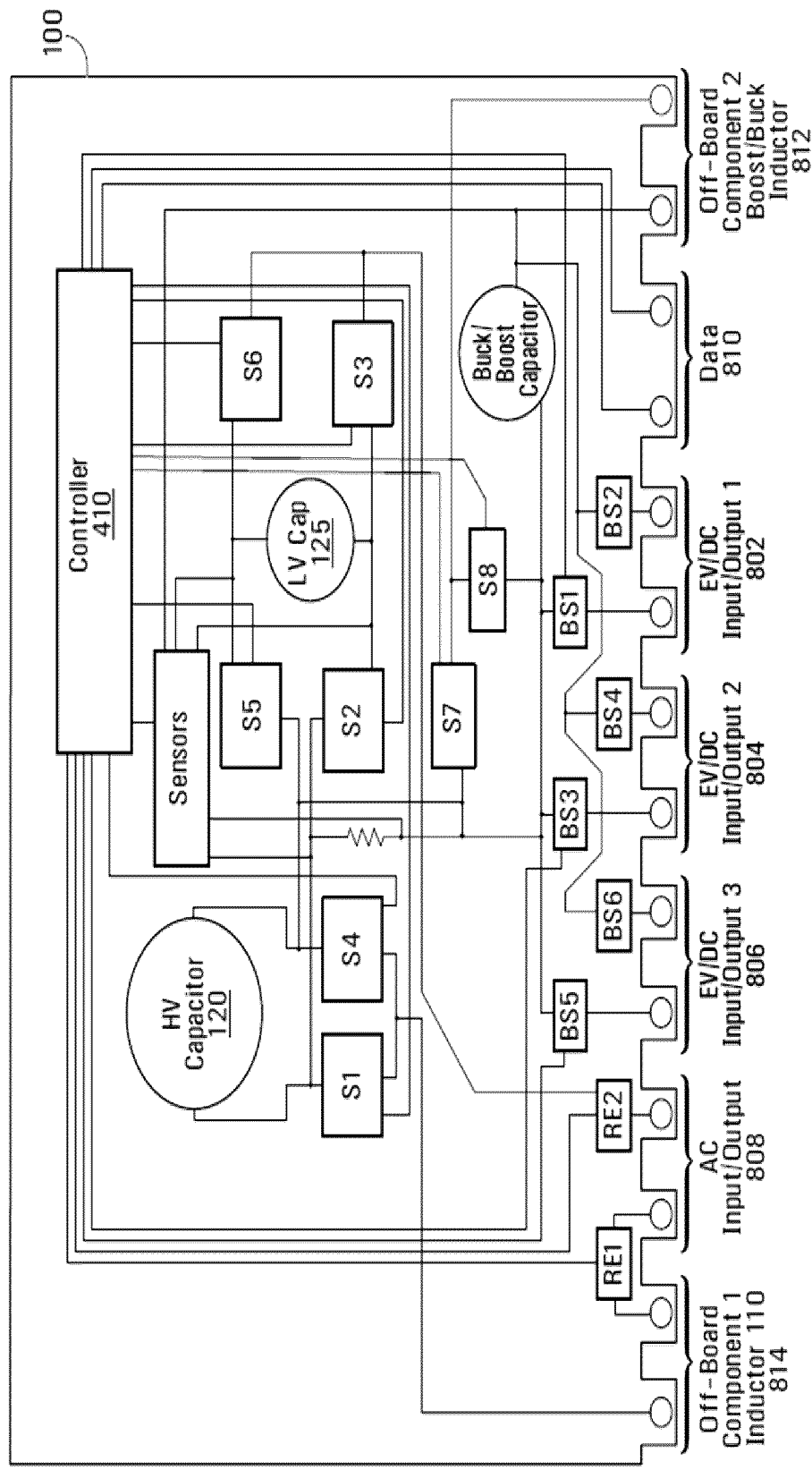
FIG. 3 is a schematic illustration of a power converter module with integrated switching capability and multiple DC outputs in accordance with one embodiment of the present disclosure.

As illustrated in FIG. 3, in one embodiment, the power converter module 100 has an integrated switching capability. A plurality of bidirectional switches BS1, BS2, BS3, BS4, BS5, and BS6 along with relays RE1 and RE2 allow the power converter module 100 to perform the switching between multiple DC ports 802, 804 and 806 and the AC port 808 on-board without needing any external switching. The ports 812 and 814 are used to connect the power converter module 100 to its off-board components in this example being the inductive filter/inductor 110 for port 814 and a buck/boost inductor 1012.

In some embodiments, a controller 410 which may be a cascaded proportional integral (PI) controller may be used to control the converter circuit as well as the switches BS1, BS2, BS3, BS4, BS5, and BS6 along with relays RE1 and RE2. More details regarding the controller used in converter circuits may be found in the applicant's PCT international application having serial number PCT/CA2018/05129 with the Publication Number WO/2019/071359.

It will be appreciated by those skilled in the art that in other embodiments a separate controller may be used to control the plurality of switches BS1, BS2, BS3, BS4, BS5, and BS6 along with relays RE1 and RE2 and may be located on a separate circuit or on a backplane connector of the converter.

Figure 4:
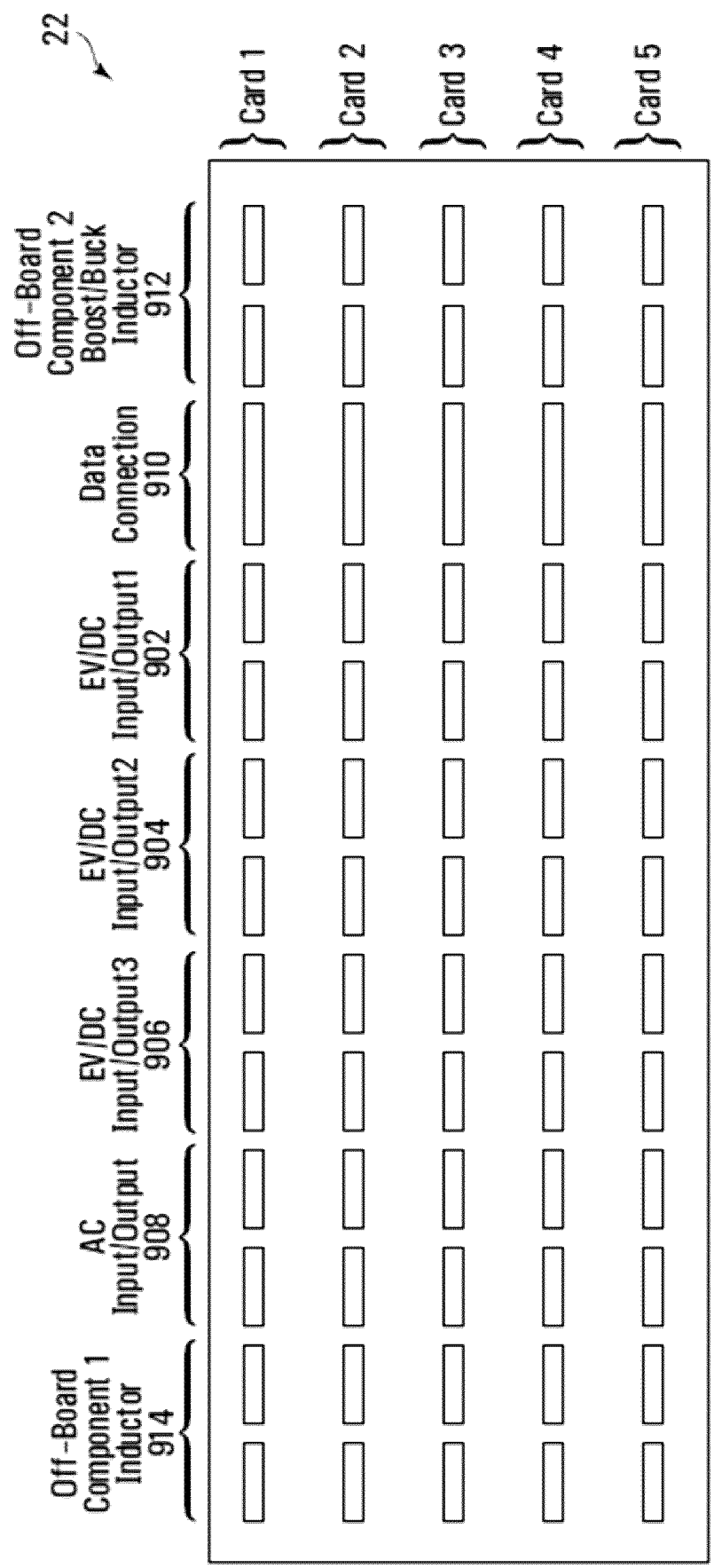
FIG. 4 is a schematic illustration of a backplane working with the power converter module shown in FIG. 3 in accordance with one embodiment of the present disclosure.

FIG. 4 shows an example of a backplane 22 that may be used by the power converter module 100 shown in FIG. 3. As explained, in this embodiment, all the switching can be done on-board the module and the backplane may be only connecting similar ports of the cards 1 to 5 to each other and to the power conversion apparatus ports. There are five series of connectors for cards 1 to 5 and each series of connectors has connectors 912, 910, 902, 904, 906, 908 and 914 which receives respectively ports 812, 810, 802, 804, 806, 808 and 814 of the power converter module 100. In one embodiment, all similar ports of different cards may be connected to each other. For example, all ports 902 of cards 1 to 5 may be connected to each other.

It will be appreciated by those skilled in the art that, although in this embodiment necessary switching exists on module 100 but the backplane 22, in some embodiments, may benefit from additional switching to connect ports to each other in a different order and combination.

Figure 5:
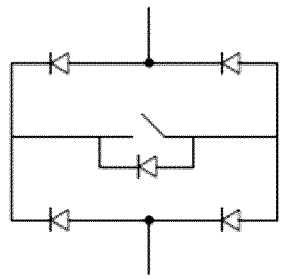
FIG. 5, FIG. 6, and FIG. 7 are schematic illustrations of some types of bidirectional switches (BS) that can be used with the plurality of switches, in accordance with one embodiment of the present disclosure.
Figure 6:
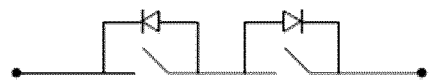
Figure 7:
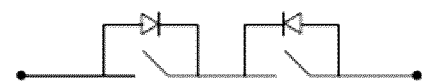

FIGS. 5, 6 and 7 are schematic illustrations of two typical type of bidirectional switches (BS) such as BS1, BS2, BS3, BS4, BS5, and BS6 that may be used for switching between AC and DC ports in some embodiments of the present disclosure.

FIG. 8 shows the power converter module 100 in an embodiment wherein it has only one DC port and one AC port. FIG. 13 shows an example of the backplane 22 which may be used by the power converter module 100 in FIG. 12. As explained, in this embodiment, all the switching can be done the backplane 22 via a plurality of switches or switching matrix 1302. Again, there are five series of connectors for cards 1 to 5 and each series of the connector has connectors 912, 910, 902, 908 and 914 which receives respectively ports 812, 810, 802, 808 and 814 of the power converter module 100 as shown in FIG. 8.

In one exemplary embodiment, the switch matrix 1302 may include the switches similar to the BS1, BS2, BS3, BS4, BS5, and BS6 along with relays RE1 and RE2 as shown and described for FIG. 3.

Figure 10:
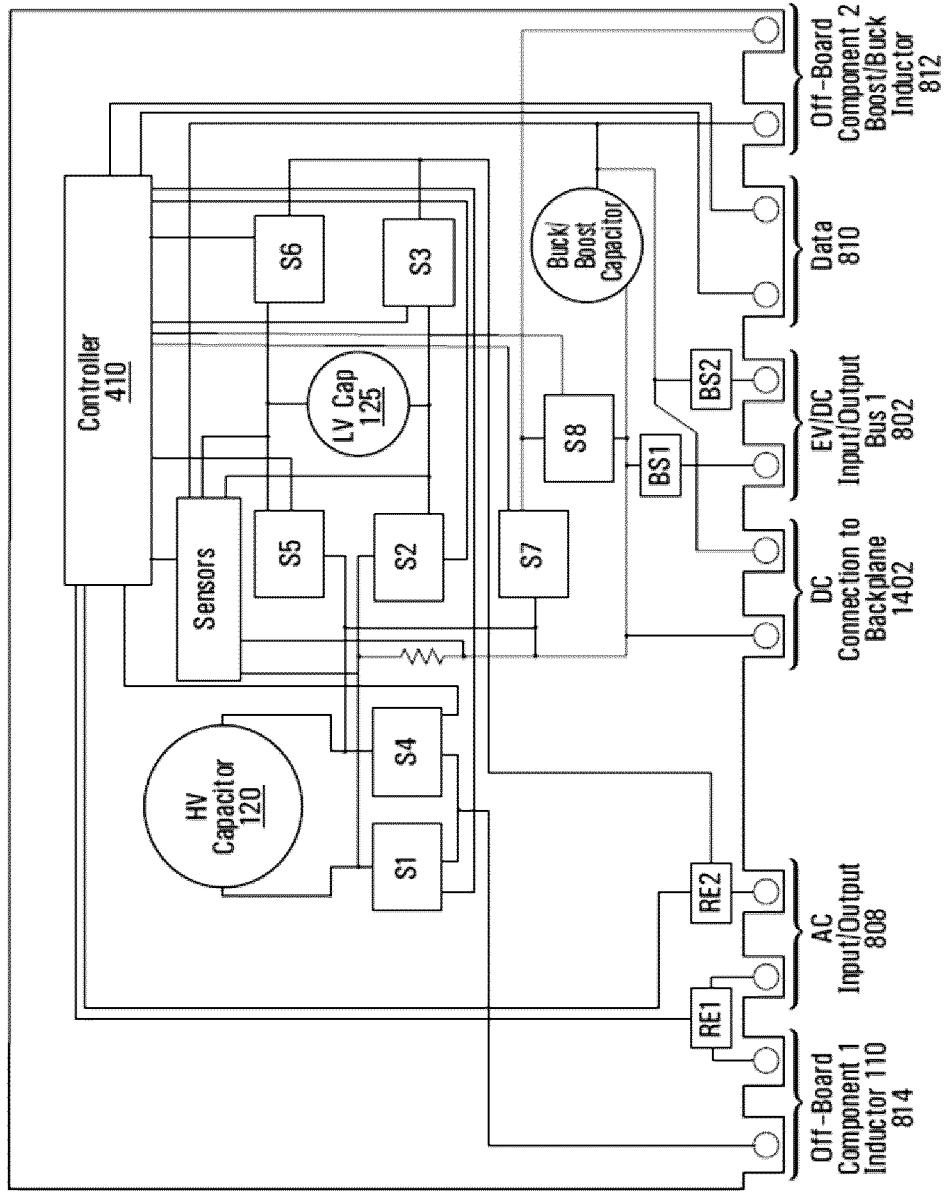
FIG. 10 is a schematic illustration of a power converter module with one DC output and one DC output to the backplane in accordance with one embodiment of the present disclosure.
Figure 11:
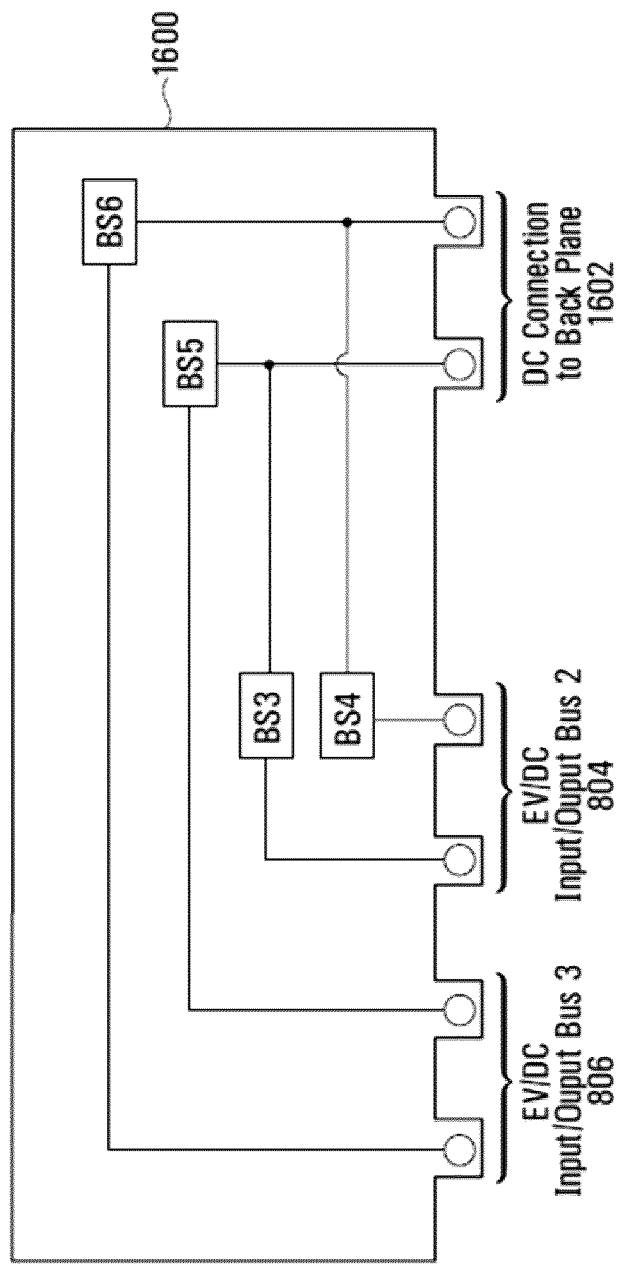
FIG. 11 is a schematic illustration of a backplane working with the power converter module shown in FIG. 10 in accordance with one embodiment of the present disclosure.

FIG. 10 is a schematic illustration of the power converter module 100 in accordance with one embodiment of the present disclosure wherein the module 100 may have one DC output and one DC output 1402 to the backplane. The bidirectional switches BS1 and BS2 along with relays RE1 and RE2 allow the power converter module 100 to perform the switching for DC port 802 and the AC port 808 on-board. The DC connection 1402 may connect to a switch card 1600 an example of which has been illustrated in FIG. 11. The switch card 1600 has a DC input connection 1602 which receives DC current from the DC output 1402 via the backplane 22 and handles the switching to two DC outputs 804 and 806 using bidirectional switches BS3, BS4, BS5 and BS6. As illustrated, in this embodiment, module 100 handles a part of the switching and an additional switch card or module may handle the rest of the switching functions.

Figure 12:
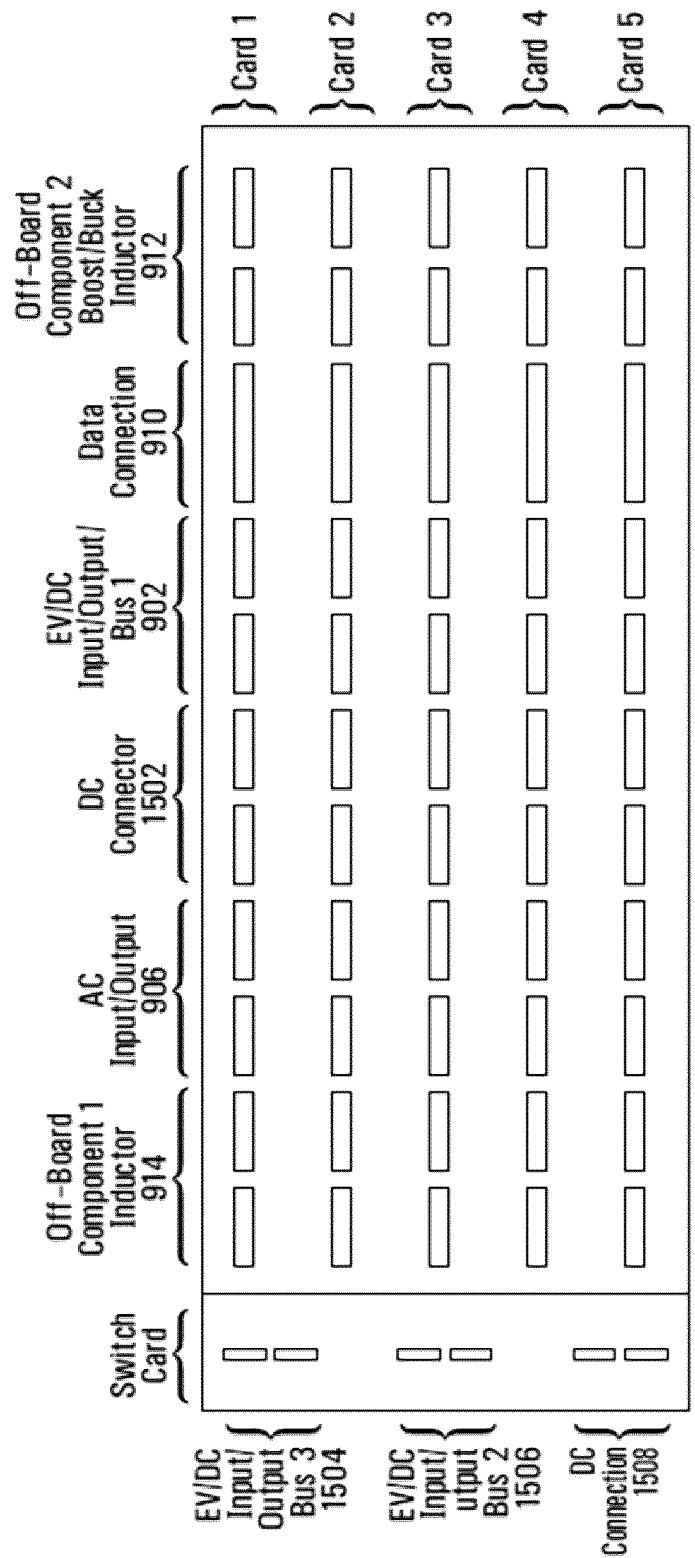
FIG. 12 is a schematic illustration of a switch card or module with one DC input from the backplane and two DC outputs in accordance with one embodiment of the present disclosure.
Figure 13:
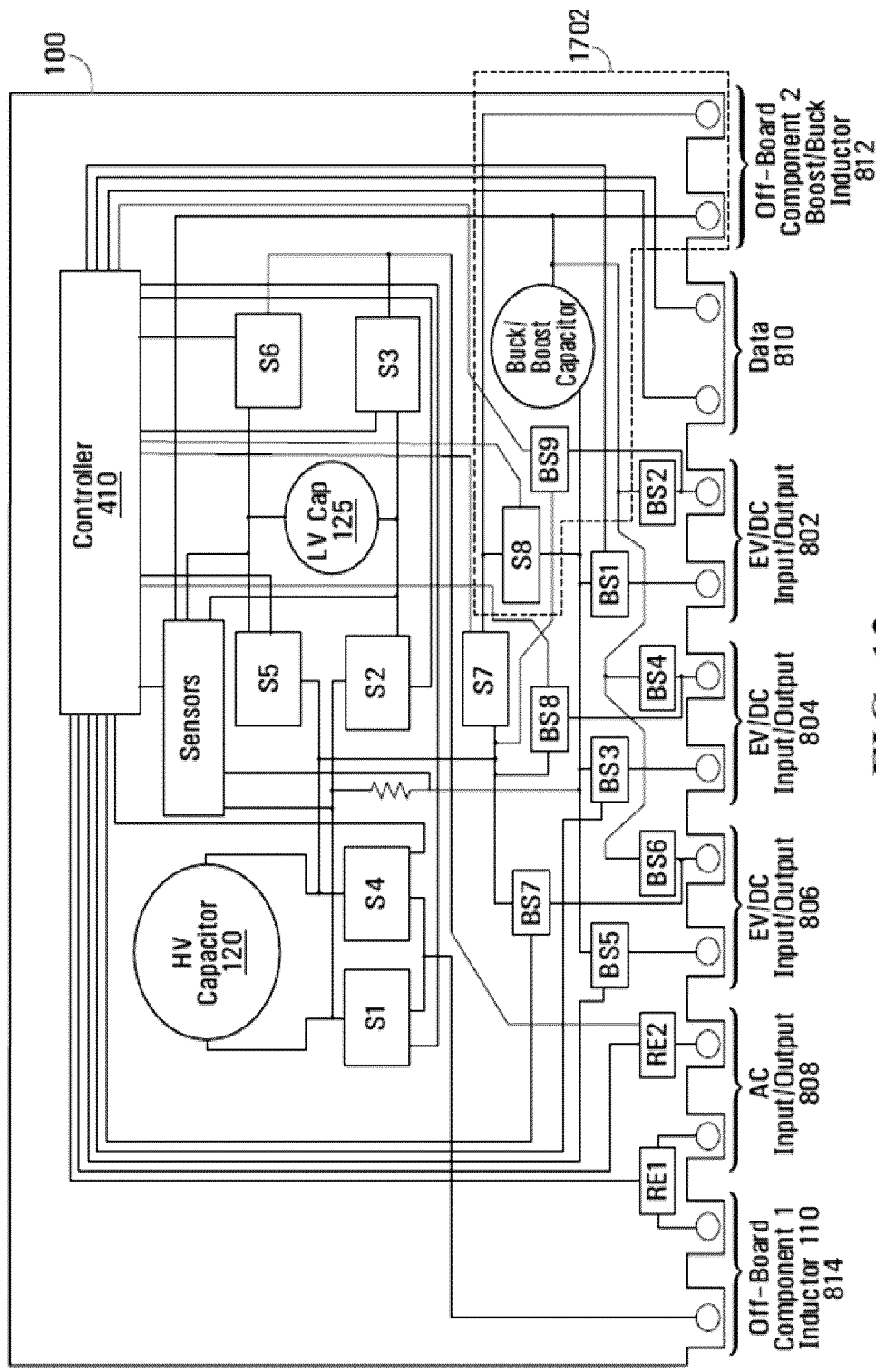
FIG. 13 is a schematic illustration of a power converter module with integrated switching capability and integrated DC to DC converting capability in accordance with one embodiment of the present disclosure.

As illustrated in FIG. 12, the backplane 22 may have five series of connectors for cards 1 to 5 and each series of connector has connectors/sockets 912, 910, 902, 1502, 908 and 914 which may receive respectively ports 812, 810, 802, 1402, 808 and 814 of the power converter module 100. The backplane may also have a port 1508 which connects to the DC connection input 1602 of the switch card 1600 as well as two DC connections 1504 and 1506 for DC connections 804 and 806 of the switch card or module 1600. In this embodiment, the backplane provides a connection between module 100 and switching module 1600 and their DC output and input via two ports 1502 and 1508.

It will be appreciated by those skilled in the art that any combination of above-mentioned embodiments can be achieved by having switching elements placed completely or partially on the modules 100, the backplane 22 and/or one or more switch cards 1600 without exceeding the scope of the present disclosure.

Referring to FIG. 13, it illustrates a different embodiment of the power converter module 100 with integrated switching capability and integrated DC to DC converting capability between three DC ports 802, 804 and 806 using additional bidirectional switches BS7, BS8, and BS9. In this embodiment, the module 100 may receive DC current from any of the DC ports (such as an EV battery, solar panel, reserve battery or any other DC source) and pass it through on-board buck-boost circuit 1702 and give to any of the other DC ports. This can be achieved using a combination of switches BS1 to BS9. In one example, the DC port 802 receives a DC current from EV1. The controller 410 opens switch BS2 and closes BS9 to direct the current towards the buck/boost circuit 1702. The output current of buck/boost circuit may be any variable DC voltage which is then directed to any other desired DC port, here DC port 804, by opening BS6 and BS2.

It will be appreciated by those skilled in the art the same switching mechanism, additional bidirectional switches BS7, BS8, and BS9, may be located on the backplane or a different module providing the same type of DC-Dc charging. The buck-boost circuit 1702 may be equally located on the backplane or a separate module to achieve the above-explained result.

Figure 14:
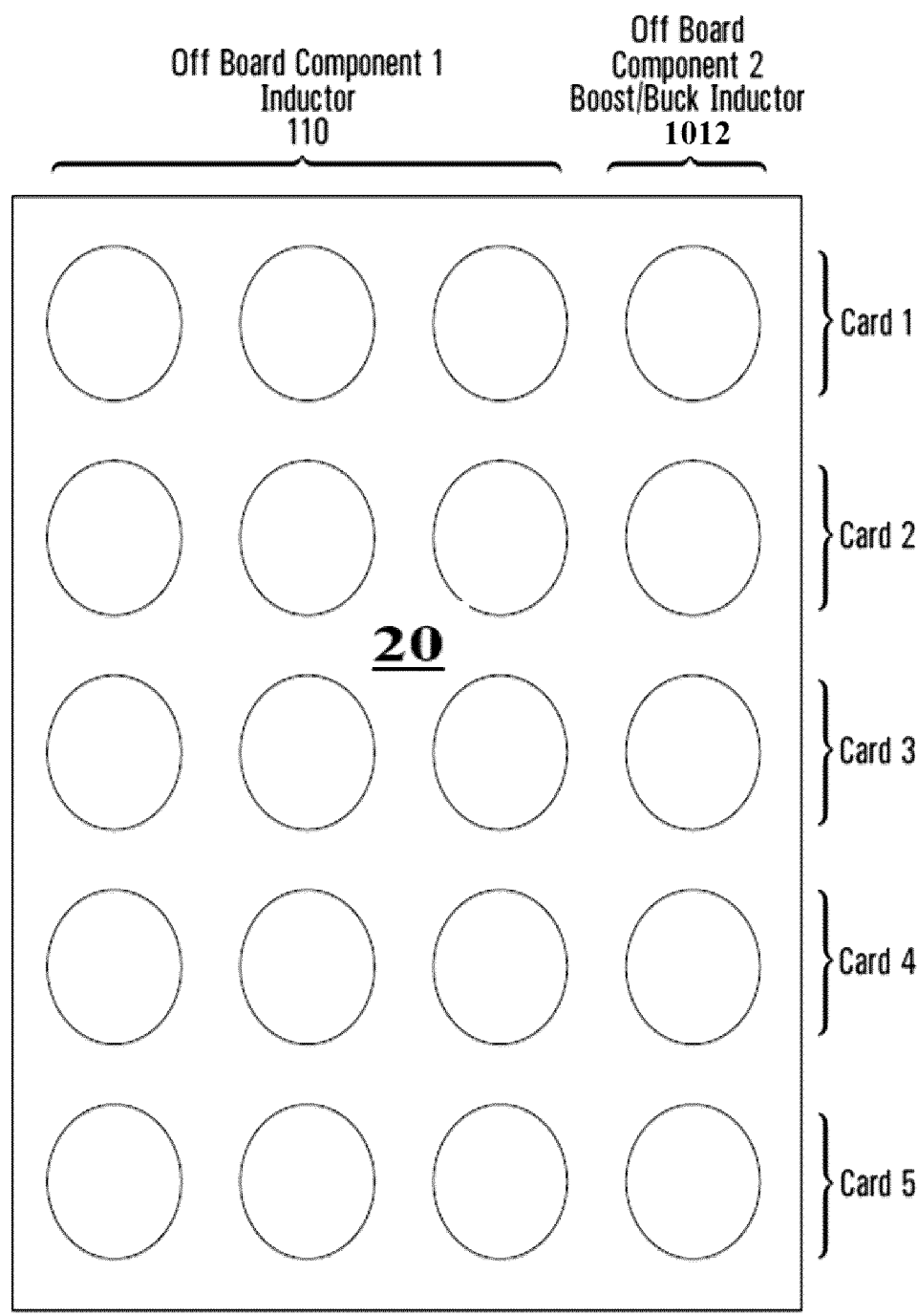
FIG. 14 is a schematic illustration of an off-board component board having off-board components of five power converter modules in accordance with one embodiment of the present disclosure.

Referring now to FIG. 14, it illustrates an off-board component board 20 housing off-board components 1012 and 110, in this embodiment, the buck/boost inductor 1012 and the inductor 110, of five power converter modules 100. The board 20 may be connected to the backplane directly or have a modular connection to the backplane. Similarly, the off-board component may be fixed permanently on the board or have sockets/connectors allowing them to be replaced or changed.

It will be appreciated by those skilled in the art that any type of rectifier, inverter or rectifier/inverter may be used in combination to provide the desired AC and DC outputs as described herein. An example of such conversion circuits may be a multi-level rectifier/inverter circuit.

It will be appreciated by those skilled in the art that the power conversion apparatus and the circuitry described in this application such as the 5-level rectifier circuit can be used in any AC to DC conversion systems such as a DC supply, other EV chargers, any other type of battery apparatus, or any other implementation requiring AC to DC conversion. Furthermore, any other type of converter circuits including other types of multilevel may be used. Also, any other type of converter may be alternatively used with the switchboard or the plurality of switches as disclosed herein without affect the way the present disclosure works.

Although the above description has been provided with reference to a specific example, this was for the purpose of illustrating, not limiting, the invention.

What is claimed is:

1. A power converter comprising:
   at least two bi-directional power conversion circuit modules each having an AC port for AC input or output, a DC input or output and at least two DC ports;
   each of said two bi-directional power conversion circuit modules comprising at least two switches for selectively connecting said DC input or output to one of said at least two DC ports;
   a switch controller for controlling said switches of said power conversion circuit modules.

2. The power converter of claim 1, wherein said at least two bi-directional power conversion circuit modules further comprise a DC to DC conversion circuit.

3. The power converter of claim 2, wherein said DC to DC conversion circuit is a buck/boost DC to DC converter circuit.

4. The power converter of claim 1, wherein said at least two DC ports are connected to at least two electric vehicle connections.

5. The power converter of claim 1, wherein said at least two bi-directional power conversion circuits modules have a multilevel converter topology.

6. The power converter of claim 1, wherein said at least two bi-directional power conversion circuit modules comprise:
   an AC input connected to said AC port through said plurality of switches;
   at least one high-voltage capacitor for storing power;
   an inductor connected in series with said AC input,
   a low-voltage capacitor,
   two high-voltage switches connected between a first AC input terminal and opposed ends of said high-voltage capacitor,
   two intermediate low-voltage power switches connected between said opposed end of said high-voltage capacitor and opposed ends of said low-voltage capacitor, and
   two terminal low-voltage power switches connected between said opposed ends of said low-voltage capacitor and a second AC terminal,
   wherein a DC load can be connected to said opposed ends of said high voltage capacitor;
   a modulator receiving a reference signal from a converter controller;
   a state selection circuit receiving said at least one comparison signal and outputting a state signal;
   a switching pulse generator receiving said state signal and connected to gates of said power switches.

7. The power converter of claim 6, wherein said inductor is connected in series with said AC input, said low-voltage capacitor, said two high-voltage power switches connected between said first AC terminal of said AC port and opposed ends of said high-voltage capacitor, said two intermediate low-voltage power switches connected between said opposed end of said high-voltage capacitor and opposed ends of said low-voltage capacitor, and said two terminal low-voltage power switches connected between said opposed ends of said low-voltage capacitor and said second AC terminal of said AC port;
   wherein each of said plurality of DC ports be connected to said opposed ends of said high-voltage capacitor; and
   wherein said controller works in an inverter mode to generate and apply to said two high-voltage power switches, said two intermediate low-voltage power switches and said two terminal low-voltage power switches signal waveforms comprising a first control signal for causing said low-voltage capacitor to be series connected with said DC port and said AC port and charged to a predetermined value proportional to a Voltage of said DC port, and a second control signal for causing said low-voltage capacitor to be disconnected from the DC port and series connected with the AC port, thereby causing the low-voltage capacitor to be discharged.

8. The power converter of claim 1, further comprising an interface for communicating with said switch controller.

9. The power converter of claim 1, wherein said switch controller is integrated in a main controller.

10. The apparatus of claim 1, wherein the switch controller is selectively operable to:
   connect the AC port to any of said at least two DC ports via one of said at least two bi-directional power conversion circuit modules;
   connect the AC port to any of said at least two DC ports via two or more of said at least two bi-directional power conversion circuits modules connected to each other by said at least two switches; and
   connect one of said at least two DC ports to the AC port via one of said at least two bi-directional power conversion circuits modules, and the AC port to another of at least two DC ports via another of said at least two bi-directional power conversion circuit modules.

11. A power converter comprising:
   a plurality of on-board DC ports for receiving and delivering DC current at variable voltages;
   a plurality of switches receiving current from a first port of said plurality of DC ports and delivering to at least a second port of said plurality of DC ports;
   at least one power conversion circuit connecting to said plurality of switches to receive current from said first port and said second port;
   at least one on-board AC port connecting to said at least one power conversion circuit for receiving and delivering AC current; and
   a switch controller for controlling said plurality of switches wherein said switch controller determines a first-selected group and a second selected group of switches,
   wherein said at least one conversion circuit is at least two power conversion circuits and wherein said plurality of switches are located on different power conversion circuits.

12. The power converter of claim 11, wherein said plurality of on-board DC ports comprises a solar panel connection for receiving DC current from a solar panel.

13. The power converter of claim 11, further comprising a connector backplane having plurality of module connectors, and wherein said at least one power conversion circuit is a conversion module connecting to said module connectors.

14. The power converter of claim 11, wherein said at least one power conversion circuit further comprises at least one off-board component.

15. The power converter of claim 14, wherein said at least one off-board components connects to said at least one power conversion circuit by said connector backplane.

* * * * *